Nov. 1, 1966  A. M. JOHNSON  3,282,616

SLIDING CLOSURE LATCHES

Filed May 11, 1964

United States Patent Office 3,282,616
Patented Nov. 1, 1966

3,282,616
SLIDING CLOSURE LATCHES
Alex M. Johnston, Norwalk, Calif.
(4802 Pinehurst, Garland, Tex. 75040)
Filed May 11, 1964, Ser. No. 366,502
2 Claims. (Cl. 292—128)

My invention relates to window latches and is particularly directed to the improvement of previously employed methods of latching by attachment of the leading stile of the sliding panel to the jamb member of the frame.

The fastening device which I have invented consists of three main parts, a hook and handle portion, a spring retaining portion, and a spring. It also requires a fastening device such as a screw to fasten the hook and handle portion to the spring retaining portion. The spring retaining portion is completely contained inside the leading stile of the sliding closure, as is also the spring. The hook and handle portion projects through a slot in the inside wall of the leading stile into that stile where it is fastened to the spring retaining portion by the screw. A part of the hook and handle portion remains outside of the leading stile, this exposed part being shaped so as to provide a handle by which the operator may pull back on the hook and handle portion, and so as to provide a hook which will latch behind a lip which must be provided on the fixed frame of the closure. The spring is attached to the spring retaining portion so as to provide pressure between the spring retaining portion and the interior wall of the leading stile, urging the spring retaining portion away from the wall of the leading stile through which the hook and handle portion projects. The spring retaining portion being fastened to the hook and handle portion by means of the screw, the hook and handle portion is therefore also urged against the outside wall of the leading stile through which it projects into that stile. When the device is in a latched position, the hook and handle portion is held by pressure of the spring against that wall of the leading stile, and the hook is engaged beside the lip on the frame so as to prevent the window from being moved toward an open position. To unlatch the device, the operator must pull back on the hook and handle portion, depressing the spring inside the leading stile, and disengaging the hook from the lip on the frame. With the window in an open position, movement of it back into a closed position causes the hook to contact the lip on the frame, by which it is cammed back so that it will pass over the lip, after which it is urged back into a latched position by the spring, thereby achieving automatic latching of the closure when it reaches a fully closed position. It should be noted that the angularly disposition of the hook portion which causes it to be cammed back upon contact with the lip on the frame is not only a bevel, as in the case of an ordinary door or cabinet latch, but is also a longitudinal slant which causes the top of the hook and handle portion to slide back away from the leading stile in a swinging motion, as the hook and handle portion is pivoted on its lower end by means of a notch which is created by the shoulder of the handle portion which is adjacent the inside surface of the leading stile, and the lower edge of the spring retaining portion adjacent the interior wall of the stile, this notch fitting loosely over the interior wall of the stile at the lower end of the slot in that wall through which the hook and handle portion projects.

The method described in this application has one or more of the following advantages over any methods known to your petitioner to be presently employed: (1) requires less material to manufacture, (2) requires less labor to manufacture, (3) requires less labor to install, (4) offers more positive latching action, eliminating much of the overtravel required on some devices, which on those devices allows the sliding panel to move back and forth after it is latched, such overtravel being made necessary in those devices due to the mechanical principle employed, (5) affords automatic latching when the window is moved into a closed position, (6) is more tamper-proof, (7) exposes less of the locking mechanism to view, which improves its appearance, (8) has less projection into the room, so as not to interfere with the operation of drapes or blinds, (9) affords one handle with which to unlatch the window and pull it into an open position, and (10) offers a more attractive overall appearance.

Attached to this application are drawings of my invention to which references in the following description will be made.

Figure 1:
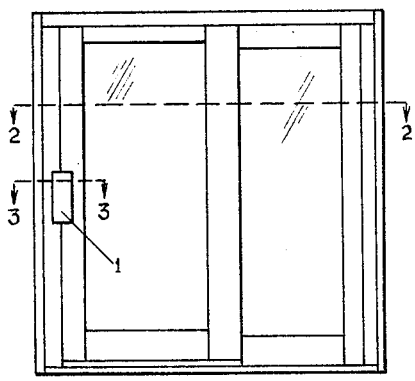
FIGURE 1 is a view of a typical horizontally sliding window employing my latch.

FIGURE 1 is an interior elevation of a sliding window showing the general location of my invention, the latch, reference number 1. The panel on the left side, to which the latch is fastened, is the sliding panel. The panel on the right is stationary.

Figure 2:
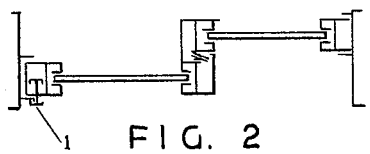
FIGURE 2 is a cross sectional view of that horizontally sliding window.

FIGURE 2 is a horizontal section of the window as indicated by section numbers 2—2 on FIGURE 1. FIGURE 2 again shows the location of my invention, the latch, reference number 1.

Figure 3:
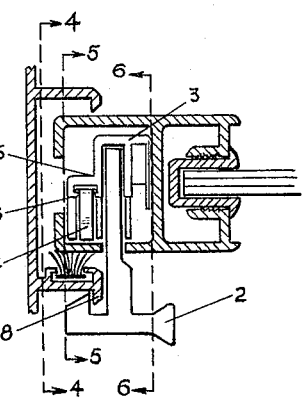
FIGURE 3 is a cross sectional view of the leading stile and frame of that window, showing a top view of the components of the latch in a latched position.

FIGURE 3 is a full size drawing of the leading stile of the sliding panel, as indicated by section numbers 3—3, FIGURE 1, showing in detail the three parts of the latch, and the location of the screw which holds two of them together. Reference number 2 indicates the exposed handle and hook portion. Reference number 3 indicates the internal spring retaining portion. Reference number 4 indicates a flat spring which is inserted into and is retained by a groove in the internal spring retaining portion, which spring applies pressure between the spring retaining portion and the interior wall of the stile, holding the spring retaining portion, and therefore the handle and hook portion to which it is attached, in a latched position. Reference number 5 indicates the location of a screw which attaches the handle and hook portion to the spring retaining portion.

Figure 4:
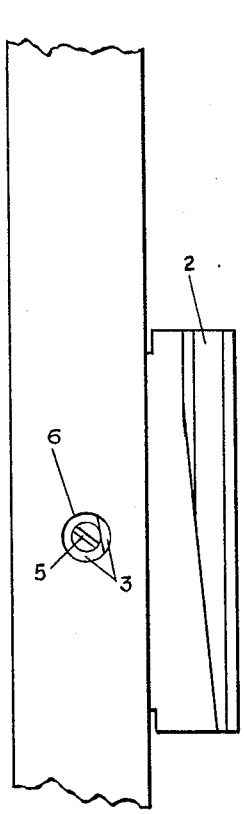
FIGURE 4 is a side view of the leading stile and the hook and handle portion of the latching device.

FIGURE 4 is a side view of the leading stile, as indicated by section numbers 4—4, FIGURE 3, showing the handle and hook portion 2 protruding out of the stile. This figure shows the access hole 6 in the lead stile, through which the attaching screw is installed. Through this hole may be seen a small portion of the spring retaining portion 3.

Figure 5:
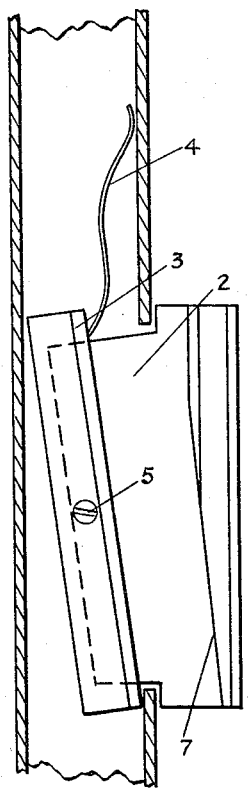
FIGURE 5 is a cross sectional view of the leading stile viewed from the same direction as FIGURE 4, but with the side wall of the stile removed so as to show the latch components inside the stile.

FIGURE 5 is a cutaway section from the same direction as FIGURE 4, but with the left side wall of the leading stile removed, as indicated by section numbers 5—5, FIGURE 3. FIGURE 5 shows the angular shape of the hidden end of the handle and hook portion 2, as shown by the dotted lines. This figure also shows, as does FIGURE 4, the angular cut, reference number 7, of the hook on the handle and hook portion. This cut is made at such an angle as to clear the point of the hook on the frame, reference number 8, FIGURE 3, at the lower end of the handle and hook portion. This arrangement allows the handle and hook portion to be cammed back upon contact with the point of the hook on the frame, reference number 8, FIGURE 3, depressing the flat spring 4 as the panel moves toward a closed position. When the panel reaches the closed position, the pressure of the spring 4 pulls the hook on the handle and hook portion into a latched position alongside the hook on the frame, thereby in effect attaching the lead stile to the frame.

Figure 6:
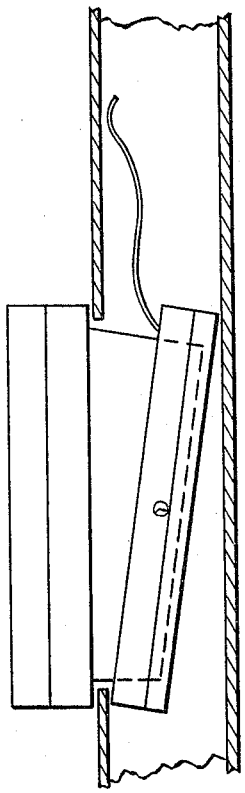
FIGURE 6 is a cross sectional view of the leading stile viewed from the opposite direction as FIGURE 4, with the side wall of the stile removed so as to show the latch components inside the stile.

FIGURE 6 is a cutaway section from the opposite side, as shown by section numbers 6—6 on FIGURE 3.

Unlatching of the window is accomplished by pulling back on the handle and hook portion, thereby depressing the flat spring, and disengaging the hook from the hook on the frame, rendering the sliding panel free to be rolled or slid to the right.

While I have shown only one application of my invention it should be understood that various changes or modifications may be made and other adaptations conceived within the scope of the appended claims without departing from the spirit of the invention. In particular it is contemplated that the device would be fabricated exactly opposite from the way it is heretofore described, for use on windows which slide from right to left instead of from left to right as shown here. It should not be limited to windows of only two panels. Two of them, one right hand, one left hand would be particularly useful as latches on units known to the trade as "XX" type, consisting of two panels both of which slide or roll. Use of one or two of them on a vertical sliding closure, depending upon whether one panel slide, known to the trade as "single hung," or both panels slide, known to the trade as "double hung," is contemplated within the scope of the appended claims.

I claim:

1. A latch device adapted for securing a closure to a closure frame strike means, comprising: relatively enlarged, opposite, angularly related, rigidly connected handle and stop portions adapted for limited pivotal movement through a portion of the closure, with the adjacent parts of said portions forming a pivot with a part of the closure, an edge of said handle portion forming a bevelled hooked end latch, a part of said edge adjacent said pivot being bevelled to provide clearance with the closure frame strike means when said device is retracted, and means resiliently urging said latch device for latching engagement with the strike means.

2. A latch device adapted for securing a closure to a closure frame strike means, comprising: relatively enlarged, opposite, angularly related, rigidly connected handle and stop portions adapted for limited pivotal movement through a portion of the closure, with the adjacent parts of said portions forming a pivot with a part of the closure, an edge of said handle portion opposite said pivot forming a beveled hooked end latch and a spring on said stop portion opposite said pivot and adapted to engage a part of the closure for urging said latch device for latching engagement with the strike.

References Cited by the Examiner

UNITED STATES PATENTS

| | | | |
|---|---|---|---|
| 1,541,046 | 6/1925 | Hall | 292—202 |
| 1,900,936 | 3/1933 | Huttger | 292—202 X |
| 2,670,982 | 3/1954 | Banham | 292—202 |
| 3,078,524 | 2/1963 | Minick. | |
| 3,161,923 | 12/1964 | Crain. | |

BOBBY R. GAY, *Primary Examiner.*

RICHARD E. MOORE, *Examiner.*

J. R. MOSES, *Assistant Examiner.*